(12) United States Patent
Kim et al.

(10) Patent No.: US 10,708,650 B2
(45) Date of Patent: Jul. 7, 2020

(54) METHOD AND DEVICE FOR GENERATING VIDEO CONTENT

(71) Applicant: Samsung Electronics Co., Ltd., Gyeonggi-do (KR)

(72) Inventors: Min Chul Kim, Gyeonggi-do (KR); Jae Sik Sohn, Gyeonggi-do (KR); Ba Do Lee, Gyeonggi-do (KR); Ji Yoon Park, Gyeonggi-do (KR); Jung Eun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 69 days.

(21) Appl. No.: 15/234,696

(22) Filed: Aug. 11, 2016

(65) Prior Publication Data

US 2017/0048581 A1    Feb. 16, 2017

(30) Foreign Application Priority Data

Aug. 12, 2015    (KR) ........................ 10-2015-0114119

(51) Int. Cl.
*H04N 21/44*    (2011.01)
*H04N 21/414*    (2011.01)
(Continued)

(52) U.S. Cl.
CPC ..... *H04N 21/44008* (2013.01); *G06F 3/0482* (2013.01); *G06F 3/0488* (2013.01);
(Continued)

(58) Field of Classification Search
CPC ........... H04N 21/44008; H04N 21/435; H04N 21/8456; H04N 21/472; H04N 21/8549; H04N 21/4223; H04N 21/44213; H04N 21/42202; H04N 21/8133; H04N 21/41407; H04N 21/84; H04N 21/433;
(Continued)

(56) References Cited

U.S. PATENT DOCUMENTS 6,493,042 B1 *  12/2002  Bozdagi .................. H04N 5/14
                                                            348/700
6,591,060 B1 *   7/2003  Buckley .................. H04N 7/00
(Continued)

FOREIGN PATENT DOCUMENTS

CN    101390033    3/2009
EP    2 063 635    5/2009
(Continued)

OTHER PUBLICATIONS

European Search Report dated Mar. 15, 2017 issued in counterpart application No. 16184079.8-1908, 6 pages.
(Continued)

*Primary Examiner* — Anthony Bantamoi
(74) *Attorney, Agent, or Firm* — The Farrell Law Firm, P.C.

(57) ABSTRACT

An electronic device and a method for generating video content in the electronic device are provided. The electronic device includes a memory; a camera; and a processor configured to generate additional information based on user interaction information obtained while an image is obtained through the camera, encode the image as video data, and store a video file including the video data and the additional information in the memory.

19 Claims, 10 Drawing Sheets

(51) Int. Cl.

| | | |
|---|---|---|
| *H04N 21/4223* | (2011.01) | |
| *H04N 21/442* | (2011.01) | |
| *H04N 21/84* | (2011.01) | |
| *H04N 21/8549* | (2011.01) | |
| *H04N 21/81* | (2011.01) | |
| *H04N 21/422* | (2011.01) | |
| *G11B 27/031* | (2006.01) | |
| *G06F 3/0482* | (2013.01) | |
| *G06F 3/0488* | (2013.01) | |
| *H04N 21/435* | (2011.01) | |
| *H04N 21/472* | (2011.01) | |
| *H04N 21/845* | (2011.01) | |
| *H04N 21/433* | (2011.01) | |
| *H04N 21/45* | (2011.01) | |

(52) U.S. Cl.
CPC ..... *G11B 27/031* (2013.01); *H04N 21/41407* (2013.01); *H04N 21/4223* (2013.01); *H04N 21/42202* (2013.01); *H04N 21/435* (2013.01); *H04N 21/44213* (2013.01); *H04N 21/472* (2013.01); *H04N 21/8133* (2013.01); *H04N 21/84* (2013.01); *H04N 21/8456* (2013.01); *H04N 21/8549* (2013.01); *G06F 2203/04806* (2013.01); *H04N 21/42201* (2013.01); *H04N 21/42224* (2013.01); *H04N 21/433* (2013.01); *H04N 21/4334* (2013.01); *H04N 21/4524* (2013.01)

(58) Field of Classification Search
CPC ........ H04N 21/42224; H04N 21/4334; H04N 21/4524; H04N 21/42201; G06F 3/0488; G06F 3/0482; G06F 2203/04806; G11B 27/00
See application file for complete search history.

(56) References Cited

U.S. PATENT DOCUMENTS

| | | | |
|---|---|---|---|
| 7,209,602 B2 | 4/2007 | Kim | |
| 7,634,144 B2 | 12/2009 | Kim | |
| 8,036,496 B2 | 10/2011 | Kim | |
| 8,208,792 B2 | 6/2012 | Morioka et al. | |
| 8,503,829 B2 | 8/2013 | Kim | |
| 9,167,164 B2 | 10/2015 | Baek et al. | |
| 2003/0056222 A1 | 3/2003 | Iwata et al. | |
| 2003/0187919 A1 | 10/2003 | Nakamura et al. | |
| 2003/0223650 A1 | 12/2003 | Kim | |
| 2006/0256223 A1 | 11/2006 | Lee | |
| 2007/0211948 A1 | 9/2007 | Kim | |
| 2007/0216659 A1* | 9/2007 | Amineh | G06F 3/0236 345/173 |
| 2008/0219654 A1* | 9/2008 | Border | G03B 13/18 |
| 2009/0103898 A1 | 4/2009 | Morioka et al. | |
| 2010/0046844 A1 | 2/2010 | Kim | |
| 2011/0267492 A1* | 11/2011 | Prentice | H04N 9/73 |
| 2011/0293245 A1* | 12/2011 | Kudo | G11B 27/034 386/248 |
| 2012/0002893 A1 | 1/2012 | Kim | |
| 2012/0008001 A1 | 1/2012 | Lee | |
| 2012/0105672 A1* | 5/2012 | Doepke | H04N 5/235 |
| 2012/0148118 A1 | 6/2012 | Lee et al. | |
| 2012/0324491 A1 | 12/2012 | Bathiche et al. | |
| 2013/0222640 A1 | 8/2013 | Baek et al. | |
| 2013/0287382 A1* | 10/2013 | Xiao | H04N 5/23203 396/59 |
| 2014/0010468 A1 | 1/2014 | Kim | |
| 2014/0189517 A1* | 7/2014 | Hughes | G06F 3/04842 715/719 |
| 2014/0196066 A1 | 7/2014 | Wu et al. | |
| 2014/0375817 A1* | 12/2014 | Meschter | H04N 5/9205 |
| 2015/0016736 A1 | 1/2015 | Kim | |
| 2015/0050006 A1* | 2/2015 | Sipe | H04N 9/87 |
| 2015/0063451 A1* | 3/2015 | Zhu | H04N 19/00121 |
| 2015/0104149 A1* | 4/2015 | Sim | G06K 9/00751 |
| 2015/0187390 A1 | 7/2015 | Pacurariu et al. | |
| 2016/0227256 A1 | 8/2016 | Kim | |

FOREIGN PATENT DOCUMENTS

| | | |
|---|---|---|
| EP | 2 632 155 | 8/2013 |
| JP | 3622711 | 2/2005 |
| KR | 10-2003-0030304 | 4/2003 |
| KR | 1020030092955 | 12/2003 |
| KR | 100630203 | 9/2006 |
| KR | 10-2009-0027796 | 3/2009 |
| KR | 1020120064581 | 6/2012 |
| KR | 10-2014-0026079 | 3/2014 |
| KR | 101377876 | 3/2014 |

OTHER PUBLICATIONS

European Search Report dated Jul. 10, 2017 issued in counterpart application No. 16184079.8-1908, 11 pages.
International Search Report dated Oct. 7, 2016 issued in counterpart application No. PCT/KR2016/006666, 10 pages.
Chinese Office Action dated Oct. 28, 2019 issued in counterpart application No. 201680045741.9, 18 pages.

* cited by examiner

METHOD AND DEVICE FOR GENERATING VIDEO CONTENT

PRIORITY

This application claims priority under 35 U.S.C. § 119(a) to Korean Patent Application Serial No. 10-2015-0114119, which was filed in the Korean Intellectual Property Office on Aug. 12, 2015, the entire disclosure of which is hereby incorporated by reference.

BACKGROUND

1. Field of the Disclosure

The present disclosure relates generally to a technique for generating video content by using media content such as an image or a video.

2. Description of the Related Art

When a user edits a video (e.g., creates a highlight video) by using an image and/or other video stored in a memory, an electronic device may obtain information on an image by post processing the image. For example, after obtaining image related property information by decoding a JPEG image with YUV, an electronic device may generate an edit image based on the obtained property information. Additionally, the electronic device may generate an edit image by selecting an arbitrary section from a playback section of a video or extracting only an iframe in the video.

Similarly, when a conventional electronic device is used to generate a highlight video from an original video, an analysis on original video data is required in order to determine a section of the original video to be used for the highlight video. That is, in the existing methodology, the electronic device performs post processing on original video data, which increases the time and resources required for generating a highlight video.

SUMMARY

Accordingly, an aspect of the present disclosure is to provide a device and method for generating a highlight video.

In accordance with an aspect of the present disclosure, an electronic device is provided, which includes a memory; a camera; and a processor configured to generate additional information based on user interaction information obtained while an image is obtained through the camera, encode the image as video data, and store a video file including the video data and the additional information in the memory.

In accordance with another aspect of the present disclosure, a video content generation method is provided for an electronic device. The method includes obtaining an image; generating additional information based on user interaction information obtained while the image is obtained; encoding the image as video data; and storing a video file including the video data and the additional information.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
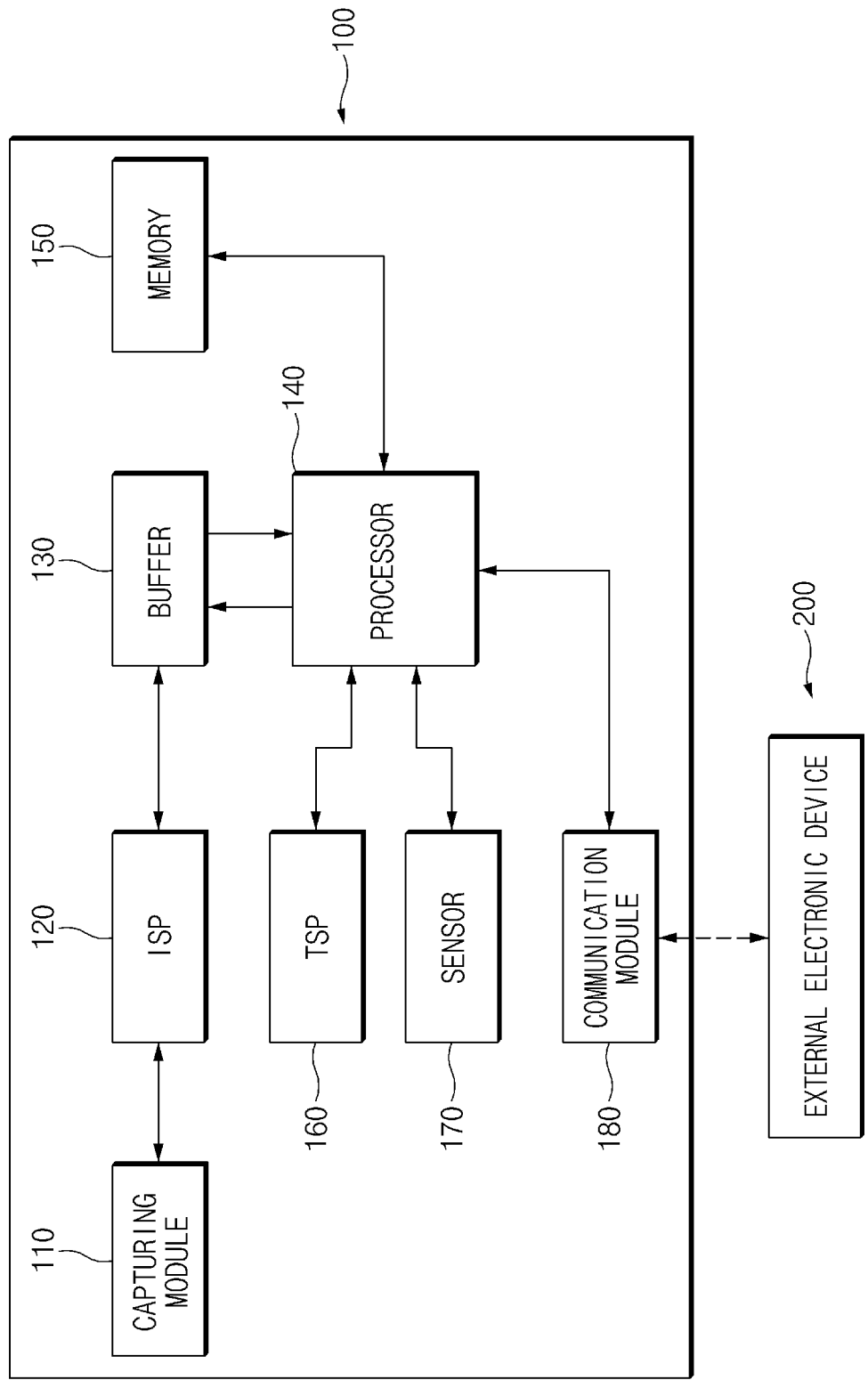
FIG. 1 illustrates an electronic device and an external electronic device according to an embodiment of the present disclosure.

Hereinafter, various embodiments of the present disclosure are described with reference to the accompanying drawings. However, this description is not intended to limit various embodiments of the present disclosure and it should be understood that the present disclosure covers all the modifications, equivalents, and/or alternatives within the scope of the appended claims and their equivalents.

In the descriptions of the drawings, like reference numerals refer to like elements.

Herein, terms used to describe specific embodiments of the present disclosure are not intended to limit the scope of other embodiments.

The terms of a singular form may include plural forms unless they have a clearly different meaning in the context.

Unless otherwise indicated as such herein, all terms used, including technical or scientific terms, may have the same meanings that are generally understood by a person skilled in the art. In general, the terms defined in the dictionary should be considered to have the same meanings that are consistent with their contextual meanings in the related art, and unless clearly defined as such herein, should not be understood abnormally or as having excessively formal meanings. In any case, even terms defined in this specification cannot be interpreted as excluding embodiments of the present disclosure.

The terms "include," "comprise," "have", "may include," "may comprise" and "may have" indicate disclosed functions, operations, or elements, but do not exclude other functions, operations, and/or elements.

For example, the expression "A or B" or "at least one of A or/and B" may indicate A, B, or both A and B.

Terms such as "1st", "2nd", "first", "second", etc., may distinguish various different elements, but do not limit the elements. For example, "a first user device" and "a second user device" may indicate different user devices regardless of their order or importance. Accordingly, a first component may be referred to as a second component, and vice versa, without departing from the scope of the present disclosure.

When a component (e.g., a first component) is referred to as being "(operatively or communicatively) coupled with/to" or "connected to" another component (e.g., a second component), the first component may be directly connected to the second component or connected through another component (e.g., a third component). However, when the first component is referred to as being "directly connected to" or "directly access" the second component, another component does not exist therebetween.

The expression "configured to" may be interchangeably used with "suitable for", "having the capacity to", "designed to", "adapted to", "made to", or "capable of" according to context.

The term "configured to" may mean "specifically designed to" in terms of hardware, or "a device configured to" in some situations may mean that the device and another device or part are "capable of". For example, "a processor configured to perform A, B, and C" may mean a dedicated processor (e.g., an embedded processor) for performing a corresponding operation or a generic-purpose processor (e.g., a central processing unit (CPU) or application processor) for performing corresponding operations by executing at least one software program stored in a memory device.

Herein, an electronic device may be a smartphone, a tablet personal computers (PC), a mobile phone, a video phone, an electronic book (e-book) reader, a desktop PC, a laptop PC, a netbook computer, a workstation server, a personal digital assistant (PDA), a portable multimedia player (PMP), an MP3 player, a mobile medical device, a camera, and a wearable device. For example, the wearable device may be an accessory type device (e.g., a watch, a ring, a bracelet, an anklet, a necklace, glasses, contact lenses, or a head-mounted-device (HMD)), a fabric or garment integrated type device (e.g., e-apparel), a body-mounted type device (e.g., a skin pad or a tattoo), or a bio-implantation type device (e.g., an implantable circuit).

Herein, the term "user" may refer to a person using an electronic device or a device (e.g., an artificial intelligence electronic device) using an electronic device.

FIG. 1 illustrates an electronic device and an external electronic device according to an embodiment of the present disclosure.

Referring to FIG. 1, the electronic device 100 includes a capturing module 110, an image signal processor (ISP) 120, a buffer 130, a processor 140, a memory 150, a touch screen panel (TSP) 160, a sensor 170, and a communication module 180.

The electronic device 100 may be wirelessly or wire connected to an external electronic device (e.g., a tablet, a smart watch, a PC, a notebook, a wearable device, etc.) through the communication module 180.

The capturing module 110 or the communication module 180 may be configured with software, hardware, firmware, or a combination thereof.

The capturing module 110 may be a camera. The capturing module 110 may include a plurality of lenses and provide the light from an object, which is incident through the lenses, to the ISP 120. The capturing module 110 may be understood as including lenses and the ISP 120, and other appropriate hardware/software modules (e.g., an aperture, a flash, etc.).

The ISP 120 may store, in the buffer 130, an image obtained through the capturing module 110. The ISP 120 may be a separate hardware device distinguished from the processor 140. The ISP 120 may also be integrated together with the processor 140, e.g., as one chip (e.g., as a system on chip (SoC)).

The buffer 130 may be a separate hardware device distinguished from other memories. The buffer 130 may be a storage space where a part of an address of Random Access Memory (RAM) is allocated.

The processor 140 may control overall operations of the electronic device 100. The processor 140 may be understood as a control module, a processing module, and/or a controller. The processor 140 may include a CPU or an application processor (AP). The processor 140 may control most of the hardware configuring the electronic device 100. The connection relationship of control/data illustrated in FIG. 1 may be exemplary, and the processor 140 may directly control the ISP 120 or the capturing module 110.

The TSP 160 may detect a touch input and/or a hovering input and provide an input event to the processor 140. Various inputs (e.g., an input through an electronic pen) may be recognizable and provided to the processor 140. For example, when a touch input (e.g., a touch input on a zoom-in menu or a multi touch) for instructing zoom-in occurs from a user during capturing, the TSP 160 may provide information on a touch input (e.g., coordinates, a multi touch, the degree of a touch pressure, etc.) to the processor 140. By using this information, the processor 140 may obtain information on a user input such as a zoom-in input occurring during the capturing.

The sensor 170 may obtain a variety of information (e.g., illumination, direction, movement, heartbeat, etc.) detected by the electronic device 100 while capturing is performed by the capturing module 110. The sensor 170 may include a plurality of sensors.

The communication module 180 may communicate with the external electronic device 200, a base station, or a server.

Figure 2:
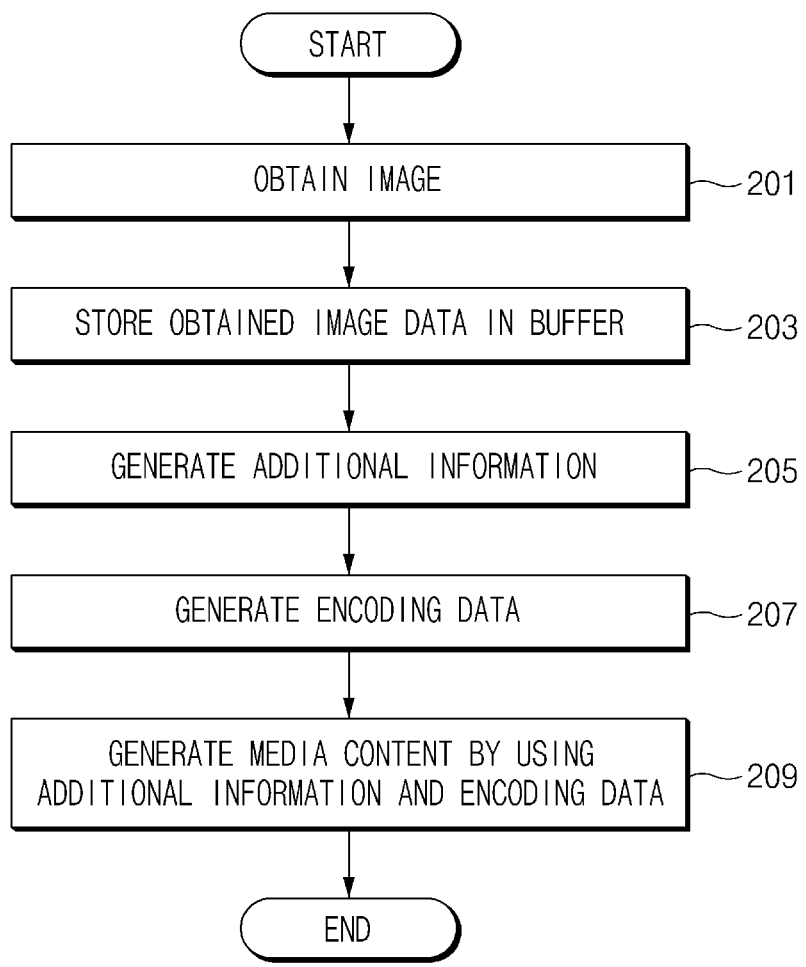
FIG. 2 is a flowchart illustrating a media content generating method according to an embodiment of the present disclosure.

FIG. 2 is a flowchart illustrating a media content generating method according to an embodiment of the present disclosure. For example, the method illustrated in FIG. 2 will be described below as being performed by the electronic device 100 illustrated in FIG. 1.

Referring to FIG. 2, in operation 201, the electronic device 100 (e.g., the capturing module 110 therein) obtains an image for generating media content, e.g., video. Once a camera is activated by a user and a capturing (or recording) function starts, the electronic device 100 may obtain the image data through the capturing module 110.

In operation 203, the electronic device 100 stores the obtained image data in the buffer 130. Appropriate image processing may be applied to the image data by the ISP 120 before the image data is stored in the buffer 130. Herein, the buffer 130 may correspond to a storage space where image data encoded or being encoded is temporarily stored, before being stored as a video file (e.g., an mp4 file) in the memory 150.

In operation 205, the electronic device 100 generates additional information relating to the image (or image data). For example, the additional information may include at least one of information obtained through an image analysis on image data stored in the buffer 130, information on a user interaction (e.g., a touch input occurring through the TSP 160) occurring while an image is captured, and situation information obtained while an image is captured. Herein, the situation information may be understood as including different types of surrounding environmental information obtainable or recognizable by the electronic device 100 during the capturing, such as information collected through the sensor 170 (e.g., ambient brightness, user hand tremors, surrounding noise level, and/or location information of the electronic device 100) and information collected through the communication module 180 (e.g., information connected through a sensor of an external device functionally connected to the electronic device 100).

In operation 207, the electronic device 100 generates encoding data. For example, the processor 140 may encode image data stored in the buffer 130 to generate encoded video data (e.g., video data, video stream, video packet, etc.).

Alternatively, operations 205 and 207 may be performed substantially at the same time (or in parallel) by the processor 140. Additionally, operations 205 and 207 may be performed by different processing modules (e.g., information collection may be performed by a CPU, and an image analysis in operation 205 and encoding in operation 207 may be performed by a graphic processing unit (GPU)).

In operation 209, the electronic device 100 generates media content, e.g., a video file, by using the additional information generated in operation 205 and the encoding data generated in operation 207.

As described above, an electronic device according to an embodiment of the present disclosure, may generate the additional information in various ways.

For example, the electronic device 100 (e.g., the processor 140 therein) may generate the additional information from a determined discontinuous area of image data occurring when an image is captured.

More specifically, when a change of a specific parameter value obtainable from image data is out of a predetermined range (e.g., above a threshold) at a specific time (e.g., the electronic device 100 moves from indoor to outdoor, or the front view (or background) or a capturing object is changed), the processor 140 may determine that a change occurs in the image captured and include information on the occurrence time of the change and the occurred change in additional information. Herein, the occurrence time of the change may include an absolute time (e.g., the current date and time) and/or a playback time in a video file (e.g., a presentation time stamp (PTS)).

For example, when a change of a parameter, such as a histogram or the sum of absolute differences (SAD), occurs more than a specified threshold, the processor 140 may store the information on the occurred change in addition to the information on the occurrence time in a tag or metadata format.

In addition, the processor 140 may generate additional information based on a gesture, an expression, or a motion, which is detected from the obtained image.

Additionally, the processor 140 may generate additional information including a time that satisfies a specified condition and corresponding audio information, which are included in audio information obtained when an image is captured. For example, the processor 140 may determine whether the volume of the audio increases or decreases suddenly or whether a waveform corresponding to a specified sound (e.g., a shout, a clap, or a specific phrase (e.g., "goal", "shoot", "homerun", etc.)) is detected, and include audio information in the additional information according the determination result.

Additionally, the processor 140 may use quality information of a capturing image obtained while the capturing module 110 performs capturing. For example, the processor 140 may check sharpness, brightness, saturation, and structure of an image obtained through the capturing module 110 and may omit information on a seriously shaky image and a critically bright or dark image in additional information. However, the processor 140 may include information on an image with a guaranteed sharpness (e.g., a blurless image) in additional information.

Additionally, when facial recognition or object recognition occurs in an image, the processor 140 may include information that the facial recognition and/or object recognition occurs and/or information (e.g., a name and a title) of the recognized face or object, with information on a time that a corresponding recognition occurs or an occurrence time duration, in the additional information.

As another example, the processor 140 may detect a user input occurring while the capturing module 110 obtains an image and include information on an occurrence time of the user input and the occurred user input in the additional information. For example, if a touch input through the TSP 160 or a user input through a touch/physical button or a key button occurs during the image capturing, the processor 140 may generate the additional information to include information on a time at which the user input occurs and the occurred user input.

For example, when a user provides a touch input for zoom-in, the processor 140 may generate the additional information to include information on a time at which the input occurs and information on the zoom-in input, e.g., 10:25:38 p.m. Jul. 20, 2015 and PTS 03:12 at which the zoom-in input occurs.

As another example, the electronic device 100 may support various functions relating to capturing. If a user input received during capturing is for activating (applying) at least one of the functions, the processor 140 may include information relating to the user input in additional information. For example, if the electronic device 100 supports an object tracking function, when a user selects a specific object (e.g., a child) during the capturing, focus or zoom may be changed continuously based on the selected child. In this case, the processor 140 may include information on a time at which the user input occurs and information on the activated function (e.g., an object tracking function) in the additional information.

When wanting to see an object closely or determining that the importance of an object is high, a user may use a zoom-in function, and in the opposite case, use a zoom-out function. According to an embodiment of the present disclosure, a zoom-in input is pre-defined as a specified user input while a zoom-out input is not pre-defined as the specified user input. That is, when a user input in a pre-defined type or form is occurred, the processor 140 may include information on the user input in the pre-defined type or form into the additional information.

Because the electronic device 100 generates additional information by analyzing information obtained in real time while an image is captured, the electronic device 100 may generate additional information including information not obtained through additional post processing and information obtained through post processing of a video file. That is, in addition to an effect that a time consumed for generation (i.e., a time used for post processing) when an edit video (e.g., a highlight video) is generated simply, there may be an additional effect that a relatively well-highlighted video content is generated based on various user inputs occurred during capturing or information detected or collected during capturing.

As another example, when data satisfying a specific condition is detected through the sensor 170 or a change in data is detected, the processor 140 may generate the additional information to include information on the data or a detection time of the change in the data and sensor related situation information. For example, a change in capturing angle may be detected by a gyro sensor or an acceleration sensor or a capturing angle may change more than a predetermined range (e.g., a portrait mode changes to a landscape mode), information on a time at which the change is detected or a time duration when the change occurs and information (e.g., angle information) on the gyro sensor may be included in additional information.

In addition, illumination sensor related information (e.g., whether an illumination value increases or reduces more than a threshold) and heart rate sensor related information (e.g., whether a heart rate increases more than a threshold or a heart rate sensor is located within a specified range) may be included in the additional information.

The above-described information is merely an example. Accordingly, other sensor information obtainable by the electronic device 100, such as ultraviolet (UV) Index information, outside temperature, humidity degree, and/or interaction information may be included in the additional information.

In addition, the processor 140 may generate the additional information to include information on a situation of the electronic device 100 occurring or changed during the capturing, such as information on whether a second camera is in an activation state when an object is captured by a first camera.

Thereafter, the processor 140 may generate a highlight video based on a specific situation (for example, a less shaky state of the electronic device 100 and a state that a user's psychological state (e.g., heart rate) is unstable or excited) by using additional information based on situation information.

As another example, the processor 140 may collect information through the communication module 180 during capturing. For example, the processor 140 may check the location of the electronic device 100 (e.g., an airport, a café, etc.) from a global positioning satellite (GPS) coordinate value on the location of the electronic device 100 or Wi-Fi connected access point information.

The communication module 180 may connect a video call to another user terminal and when media content is generated by using an image obtained from a video call or an image obtained during a video call, the processor 140 may obtain information on video call transmission/reception (e.g., a video call time, the other party of a video call, etc.). For example, the information on the video call transmission/reception may include quality information of a video call and the transmission/reception sensitivity of a video call (e.g., a change in received signal strength indication (RSSI) value during a video call).

Additionally, the processor 140 may obtain information satisfying a specified condition from an external electronic device (e.g., a wearable device) connected through the communication module 180. For example, a signal for controlling a camera (e.g., picture capturing during video capturing, zoom-in/zoom-out, slow motion capturing, etc.) may be obtained from a wearable device connected to the electronic device 100 through Bluetooth (BT) during the capturing. The obtained information, in addition to information on an acquisition time, may be included in the additional information. For example, when heart rate information of greater than a predetermined value is obtained from a wearable device connected through the communication module 180, the processor 140 may include information on an acquisition time and heart rate information in the additional information.

As another example, the processor 140 may generate additional information according to user feedback information. For example, when an image that the electronic device 100 captures is broadcast in real time via network, feedback by a user watching the broadcast may be collected. When the user feedback is more than a predetermined level, the processor 140, may include information on a corresponding time in the additional information. For example, when the number of comments, input by viewers, per minute, exceeds a reference value, when there is a time at which a viewing rate is greater than a reference value, or when a user provides a specified feedback, such as like/recommendation, this information may be included in the additional information.

The processor 140 may also select an important object (e.g., an important person) based on internal/external information of the electronic device 100 at the time of capturing, and include information on the important object in the additional information. Through such additional information, the electronic device 100 may generate a highlight image based on an important target.

For example, the processor 140 may analyze information (e.g., a face image) on a frequently contacted user or a user added to favorites among users included in a contact list of the electronic device 100 in advance. Alternatively, the processor 140 may perform analysis while an image is captured. When face recognition on the important object occurs in an image, the processor 140 may include an image of the recognized face in addition to a high priority indication in the additional information.

The processor 140 may only include information on a recognized object in the additional information during capturing, and later use information on the important object and the information on the recognized object included in the additional information when generating a highlight video.

In addition, the processor 140 may configure an important object according to a user's schedule, e.g., based stored calendar events, the frequency of appointments, or posts through social networks or messenger applications.

An important object in an image is not limited to a person or a person's face. For example, the processor 140 may configure a specific image (e.g., a vehicle) as an important object in advance. When video capturing starts, after an important object is configured, the processor 140 may also include a high priority indication with respect to an object recognized as the vehicle in the additional information during the capturing.

The different types of information obtainable during video capturing is not limited to the above-described examples and various other extensions are possible. Additionally, the above-described embodiments may be applied to additional information obtained by image analysis or an audio analysis.

Figure 3:
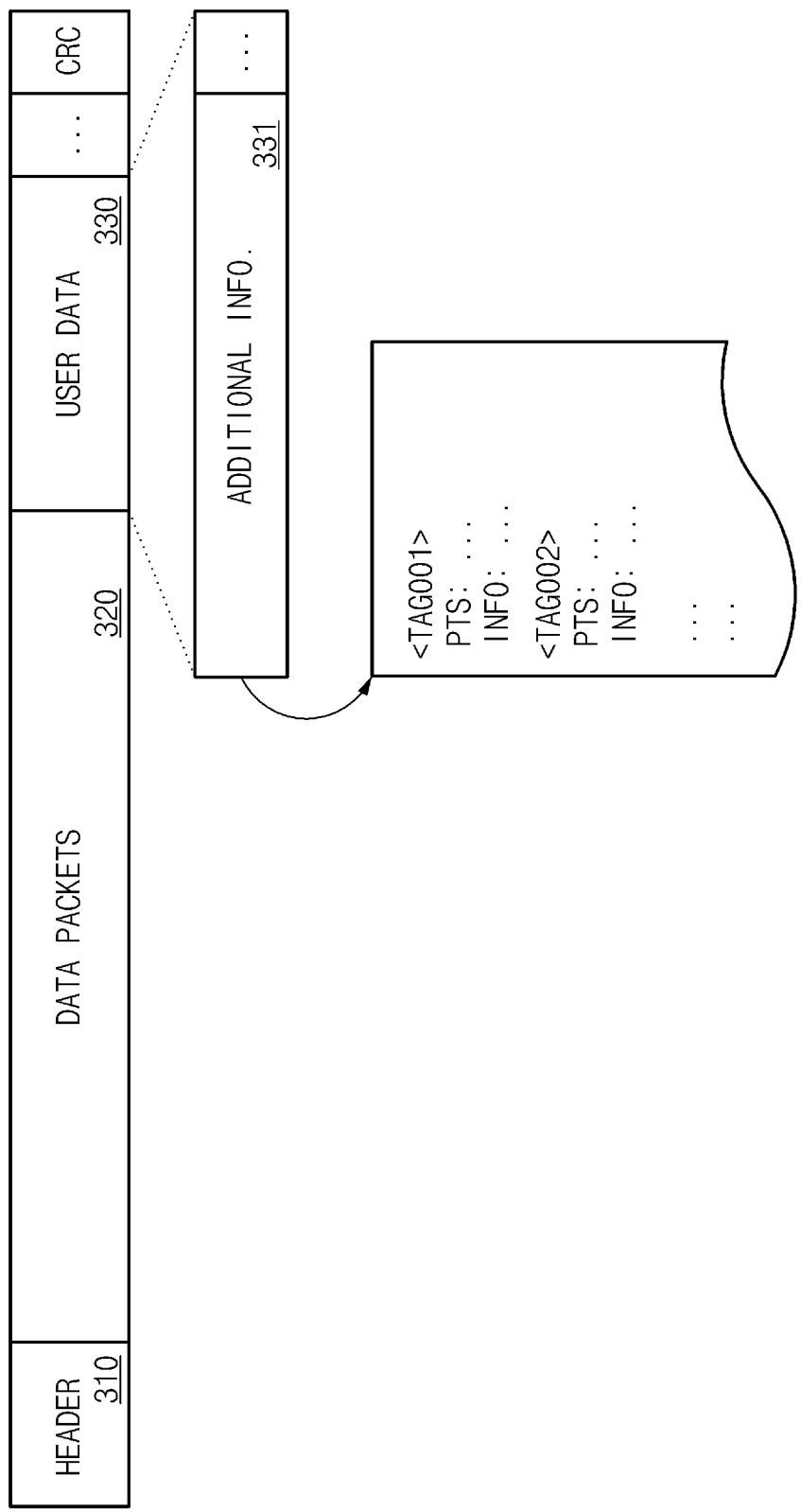
FIG. 3 illustrates a video file structure according to an embodiment of the present disclosure.

FIG. 3 illustrates a video file configuration according to an embodiment of the present disclosure.

Referring to FIG. 3, the video file includes a header 310, data packets 320, user data 330, and data appropriate for other file formats (e.g., cyclic redundancy check (CRC) data). The structure of the video file may be modified variously, but generally includes data for defining the video file (e.g., the header 310), video data (e.g., the data packets 320), and additional information (e.g., the user data 330).

For example, an MP4 file may include a file type box "ftyp" for checking the comparability of a file, a movie box "moov" for storing all metadata of media, and a media data box "mdat" for storing actual media data.

The user data 330, i.e., where the additional information is stored, may be an area separated from a metadata area (e.g., "moov" in an mp4 file) of a conventional file format. For example, because a media file normally has a standard specified according to the type of each media file, the additional information may be stored in a user data area that a user utilizes. Accordingly, in FIG. 3, the additional information 331 is included in the user data 330.

The additional information 331 may be provided in a tag, metadata, or various formats (e.g., xml document) defined to parse the additional information 331 in a system or an application. For example, information collected while image capturing for generating a video file is in progress may be included in the additional information 331. The additional information 331 may have a tag corresponding to each information (or event) and each tag may include a PTS corresponding to a playback time point of a video and event related information.

Additionally, the additional information 331 may include information on an actual time, i.e., date and time, at which each event occurs. Alternatively, the additional information 331 may include information relative to a generation time (or a capturing time) of a video file, e.g., 1 minute and 24 seconds into the video.

Figure 4:
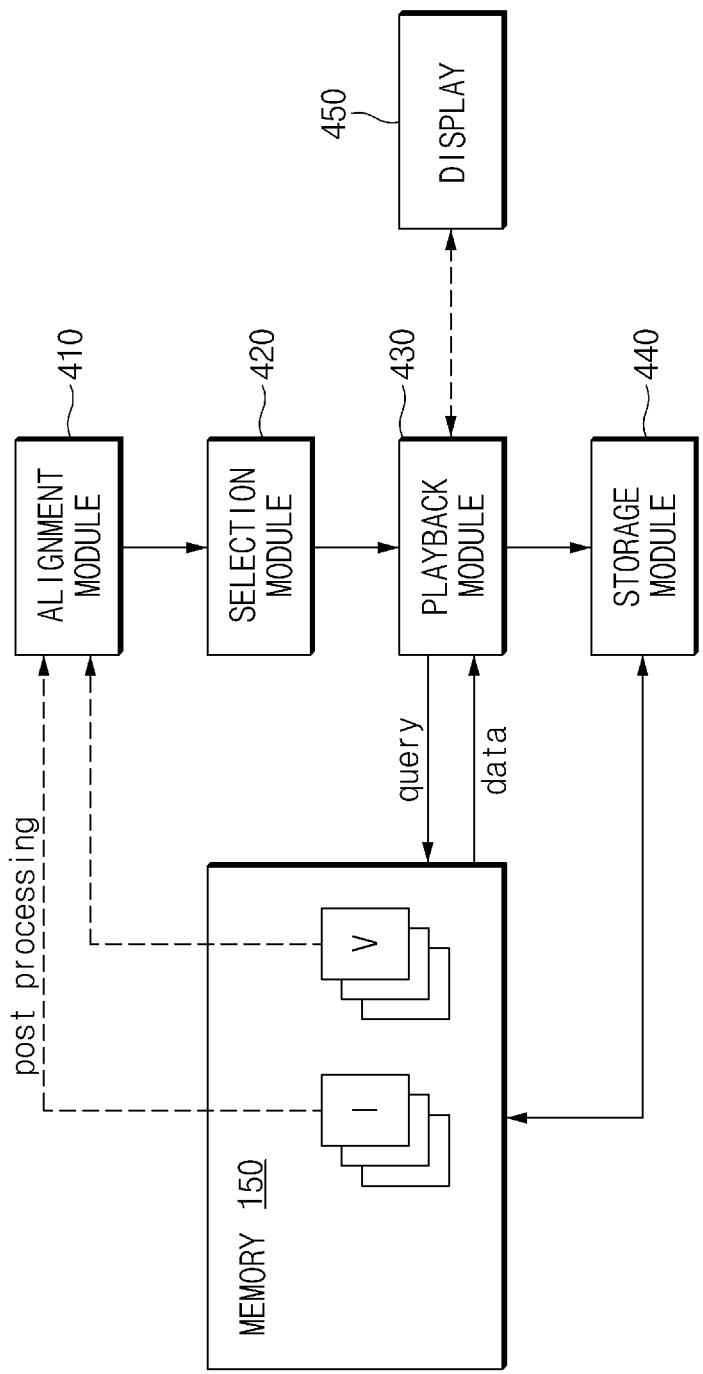
FIG. 4 illustrates an electronic device for generating a highlight video according to an embodiment of the present disclosure.

FIG. 4 illustrates an electronic device for generating a highlight video according to an embodiment of the present disclosure.

Referring to FIG. 4 and FIG. 1, an electronic device 100 may generate a highlight video by using images I and videos V stored in a memory 150. For example, an alignment module 410 may obtain metadata from images and videos stored in the memory 150 and align the metadata according to a specified standard (e.g., a time order, an importance order, etc.).

A selection module 420 may select metadata to be used for the generation of a highlight video among the aligned metadata.

A playback module 430 may query data to the memory 150 based on the selected metadata, and output a highlight video to the display 450 by using the queried data.

When a storage event occurs with respect to the played highlight video, a storage module 440 may store the highlight video as an additional video file in the memory 150.

The alignment module 410, the selection module 420, the playback module 430, and the storage module 440 may be a software module or engine controlled by a processor. That is, an operation performed by the alignment module 410, the selection module 420, the playback module 430, and the storage module 440 in FIG. 4 may be understood as an operation performed by a processor, e.g., the processor 140 as illustrated in FIG. 1.

The alignment module 410, the selection module 420, the playback module 430, and the storage module 440 may be configured with software, hardware, firmware, or a combination thereof.

Figure 5:
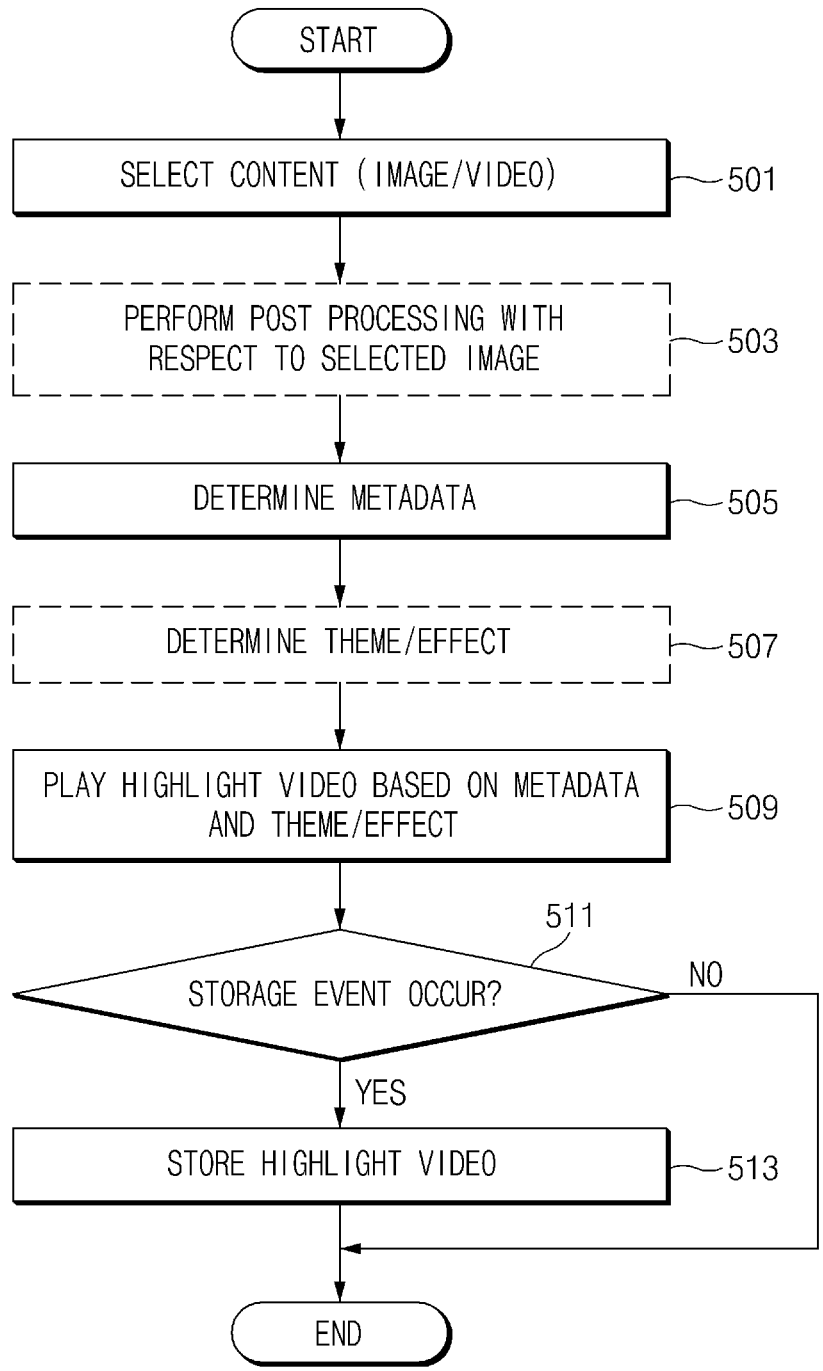
FIG. 5 is a flowchart illustrating a method for playing and storing a highlight video according to an embodiment of the present disclosure.

FIG. 5 is a flowchart illustrating a method for playing and storing a highlight video according to an embodiment of the present disclosure. For example, the method illustrated in FIG. 5 will be described below as being performed by the electronic device 100 illustrated in FIG. 4.

Referring to FIG. 5, in operation 501, the electronic device 100 selects content for playing a highlight video from stored content (images/videos). For example, the content stored in the memory 150 of the electronic device 100 may be classified into a plurality of events. That is, a media library of the electronic device 100 may include a plurality of events and each event may include a plurality of contents (e.g., content files such as video files and/or image files). For example, content generated or obtained at a corresponding time may be included in an event corresponding to a specific time (e.g., one month, one quarter, one year, etc.). Images or videos captured at a corresponding place may also be included in a specific place (e.g., Yosemite travel) event.

An event including a plurality of content may be automatically configured by the electronic device 100 according to a specified setting, or may be manually configured by a user.

A user may select a specific event for generating/playing a highlight video on a specific event. Alternatively, regardless of an event, a user may select content stored in the memory 150 and command the generation of a highlight video based on the selected content.

In operation 503, the electronic device 100 performs post processing on an image among the selected contents. For example, when an image is included in content (or event) selected in operation 501, a processor may obtain metadata through a post processing task on the image. If the content selected in operation 501 is configured with only videos, a post processing operation on an image may be omitted.

In operation 505, the electronic device 100 may determine metadata to be used for generating a highlight video. For example, the alignment module 410 may align additional information of a video and metadata of the image obtained in operation 503 according to a generation time order. For example, the metadata may include additional information obtained from a video file and metadata obtained from an image.

When aligning metadata, the electronic device 100 may combine metadata (i.e., the additional information) obtained from a plurality of videos and metadata obtained from a plurality of images and list the combined metadata in chronological order. Herein, the time may correspond to at least one of, in the case of a video, an occurrence time of a specified condition included in additional information of the video, a capturing completion time of the video, a capturing start time of the video, and a storage time of an image captured during capturing, and in the case of an image, a capturing time of the image. For example, the electronic device 100 may support image capturing during video capturing.

With respect to an image, time information (e.g., EXIF information) may be generated based on a capturing time (or a time at which image encoding is completed). With respect to a captured video, time information may be generated based on a time at which video capturing stops (or a time at which encoding of a video is completed).

When a highlight video is generated by using the captured video and an image captured during video capturing, time information of an image has a previous time value than time information of a video, and accordingly, a captured image may be provided earlier than images selected from a video in a highlight video. Additionally, for an image having earlier time information than an image captured during the video capturing among images selected from a video, the image may be provided first in a highlight video.

When the alignment of metadata is completed, the selection module 430 may determine metadata to be applied to a highlight video among metadata. The selection module 430 may determine a priority according to the weight of each metadata, and select metadata in a priority descending order. For example, the selection module 430 may cluster parts where a scene of similar information appears and assign a weight to meaningful information in a clustered area, for example, the size of a recognized face, the number of faces, a degree of shaking of an image, etc.

For example, an image of a time at which a face is recognized may have a higher priority than an image of a time at which no face is recognized. Additionally, an image having a predetermined level of illumination may have a higher priority than a too bright or too dark image. Additionally, an image of a duration where an object tracking function is applied may have a higher priority than an image of another duration. Additionally, an image of a time at which a change value of histogram or SAD is large may have a higher priority than an image of another time point. Additionally, an image of a duration captured in a zoom-in state may have a higher priority than an image of a duration captured in a zoom-out state. An image of a duration where a high heart rate is maintained during capturing may have a higher priority than an image of a duration where a normal heart rate is maintained.

In operation 507, the electronic device 100 determines a theme or an effect to be applied to the determined metadata. For example, this operation may be performed in the selection module 420 and may be performed by the playback module 430 during playback.

When metadata is determined, a predefined theme may be applied or a theme may be applied according to information of metadata. For example, when there are many dynamic images among images corresponding to metadata, a dynamic theme may be applied. Additionally, when an image is captured at a specific time (e.g., Christmas, New Year, Thanksgiving, Easter, Halloween, etc.), a theme fit for a corresponding season may be applied. Additionally, when there are many bright atmospheric images or dark atmospheric images according to an analysis result of an image, a theme according thereto may be applied. Herein, a theme may include an acoustic effect, e.g., background music, in addition to a visual effect applied to the highlight video playback.

Effects may be applied with respect to data selected for generating a highlight video (e.g., some durations of image or video data) or with respect to a gap between different data (e.g., a gap while switching from an image to another image, from an image to a video, or from a video to a video). For example, an appropriate effect may be applied by a GPU with respect to a screen switch or content display. For example, in accordance with the beat of background music, an effect may be provided (changed), an image collage effect may be provided, a fast change effect of zoom-in/zoom-out may be provided based on a face position, or an image effect (e.g., an effect such as gif, a slow motion effect, an overlapping effect, etc.) for continuous pictures may be provided.

In operation 509, the electronic device 100 plays a highlight video based on the determined metadata and the determined theme/effect information. For example, the playback module 430 may query original data to the memory 150 based on metadata, and output data provided from the memory 150 together with a specified theme/effect to the display 450.

For example, when one hundred different contents are included in an EVENT 1 of a media library, the selection module 420 may select five images and two video files (or metadata corresponding thereto). In this case, metadata corresponding to some PTSs in additional information in a video file may be selected. For example, the electronic device 100 may obtain information that a first video file is played from 2 seconds to 4 seconds and a second video file is important from 30 seconds to 34 seconds through the metadata alignment of the alignment module 410 and the metadata selection of the selection module 420. When a highlight video is played, the playback module 430 may play the highlight video by querying the memory 150 in the order of EVENT 1=IMG1.JPG, IMG2JPG, IMG3.JPG, IMG4.JPG, IMG5JPG, VIDEO1.MP4(02:00~04:00), and VIDEO2(30:00~34:00).

Figure 6:
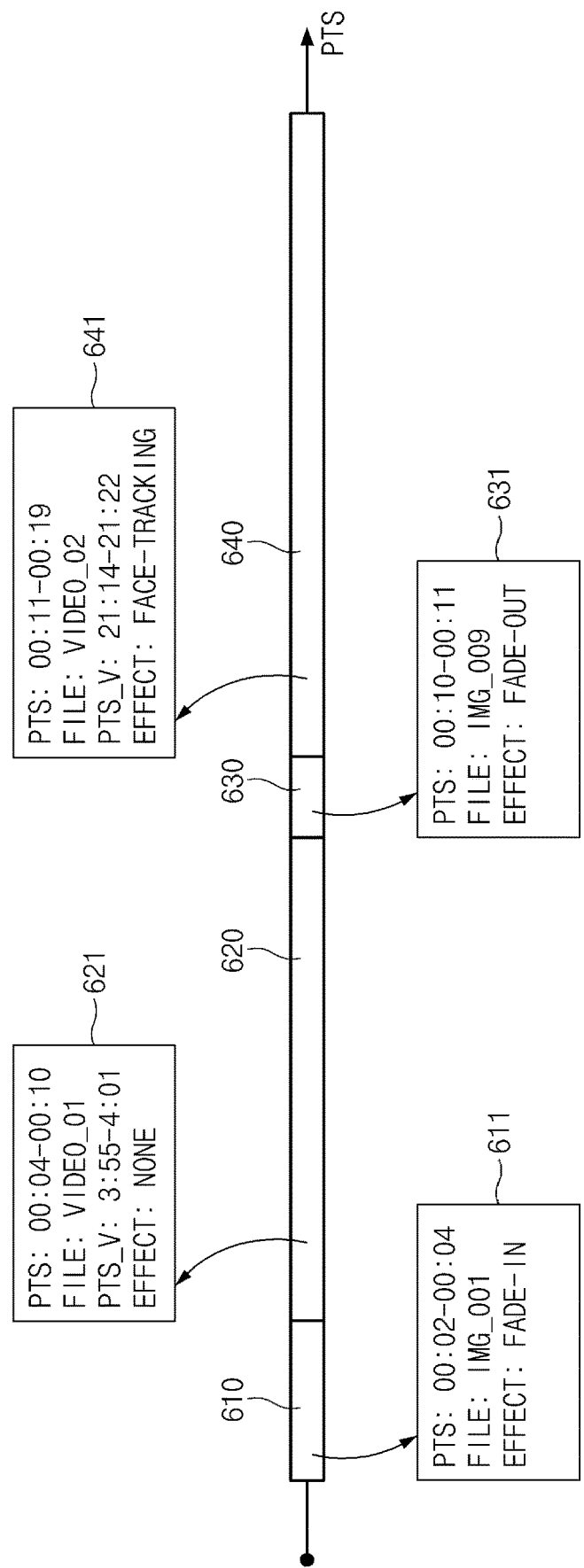
FIG. 6 illustrates a highlight video configuration according to an embodiment of the present disclosure.

FIG. 6 illustrates a highlight video configuration according to an embodiment of the present disclosure.

Referring to FIG. 6, the electronic device may play a highlight video by using IMG_001.JPG, IMG_009.JPG, VIDEO_01.MP4, and VIDEO_02.MP4. That is, when operations 501 to 507 are performed, at least the four files may correspond to metadata of which priority is determined as high.

The playback module 430 may play a highlight video by using IMG_001 in a duration 610 corresponding to 2 seconds to 4 seconds. Although a highlight video is played by using another content in a 0 to 2 second duration, for convenience of description, description for the playback of a duration other than 2 seconds to 19 seconds is omitted.

In the duration 610, the playback module 430 may play an IMG_001 file based on playback information 611. The playback information 611 may be information generated based on metadata information corresponding to IMG_001 and information generated based on theme/effect information determined in operation 507. For example, the playback module 430 may output this file together with a slow FADE-IN effect. An effect applied to each duration may be determined in operation 507. Although one effect is shown with respect to one duration in an embodiment of FIG. 6, a plurality of effects may be applied to one duration and an effect for duration entry may be defined when entering from one duration to the next duration.

The playback module 430 may play a VIDEO_01 file based on playback information 621 in a duration 620 corresponding to 4 seconds to 10 seconds of a highlight video. For example, the playback module 430 may query video data corresponding to PTS(PTS_V) 3:55 to 4:01 of the VIDEO_01 file to the memory 150 and play corresponding video data for a duration 620. The playback information 621 may be information generated based on additional information corresponding to PTS 3:55 to 4:01 of VIDEO_01 and theme/effect information determined in operation 507.

In a similar manner, the playback module 430 may play a highlight video based on information 631 and 641 by using each IMG_009 file and VIDEO_2 file with respect to a duration 630 and a duration 640.

Additionally, when playing a highlight video, the electronic device 100 may present information on an original image based on metadata. For example, the electronic device 100 may output information on an original image (e.g., the file name of an original image and PTS information in an original image) through a method such as an overlay on a highlight video.

Additionally, the electronic device 100 may provide information on the additional information. For example, information that a zoom-in input occurs and information that object tracking is performed may be outputted through overlay, pop-up, or speech balloon on a highlight video image.

In FIG. 6, an example is provided where a specific section of a video file is played when a highlight video generated from the video file is played. That is, the specific section of the video file is used to generate the highlight video. However, in another example, according to metadata determined based on additional information, an image (e.g., I-frame) corresponding to a specific time point (e.g., PTS) may be used for generating a highlight video.

Referring again to FIG. 5, in operation 511, the electronic device 100 (e.g., the storage module 440) determines whether a storage event occurs. For example, when an input for playing a highlight video, which is being played through the display 450 of the electronic device 100 or is played completely, occurs, the storage module 440 may store the highlight video in the memory 150 in operation 513.

If the storage event does not occur, the process may be terminated after playing the highlight video. That is, when the storage event does not occur, the highlight video does not occupy the storage space of the memory 150. In this case, metadata information and theme/effect information (e.g., the playback information described with reference to FIG. 6), which are determined to generate a highlight video, may be stored in the memory 150. However, because a highlight video, when being played by the playback module 430, temporarily occupies a partial space allocated to a specific memory (e.g., RAM)), but does not occupy a storage space of the electronic device, the usage efficiency of a system resource in the electronic device 100 may be improved.

As illustrated in FIG. 6, a highlight video may be generated by using metadata determined in operation 505. That is, all durations of a highlight video may include metadata corresponding to each duration. Alternatively, if metadata for generating a highlight video is insufficient or some durations in a highlight video are configured to be filled with random images, regardless of metadata, some durations of a highlight video may not include corresponding metadata. For example, among a plurality of events included in the above-mentioned media library, if a small number of content (e.g., one video and two images) are included in an event for generating a highlight video, the electronic device 100 may determine metadata according to the method illustrated in FIG. 5, and generate a video according to a random or specified reference (e.g., extracts an image corresponding to I-frame in a video file) additionally.

Because metadata to be included in a highlight video is determined according to priority, an image (or a video duration) included in a highlight video without metadata may have a relatively low priority. Accordingly, when playing the highlight video in operation 509, the electronic device 100 may differently set playback conditions of a playback duration with metadata and a playback without metadata. For example, the electronic device 100 may play a duration without metadata faster than a duration with metadata. Additionally, the electronic device 100 may configure a relatively low image quality with respect to a duration without metadata by using image processing, such as loss compression, and accordingly, reduce the size of a highlight video.

Figure 7:
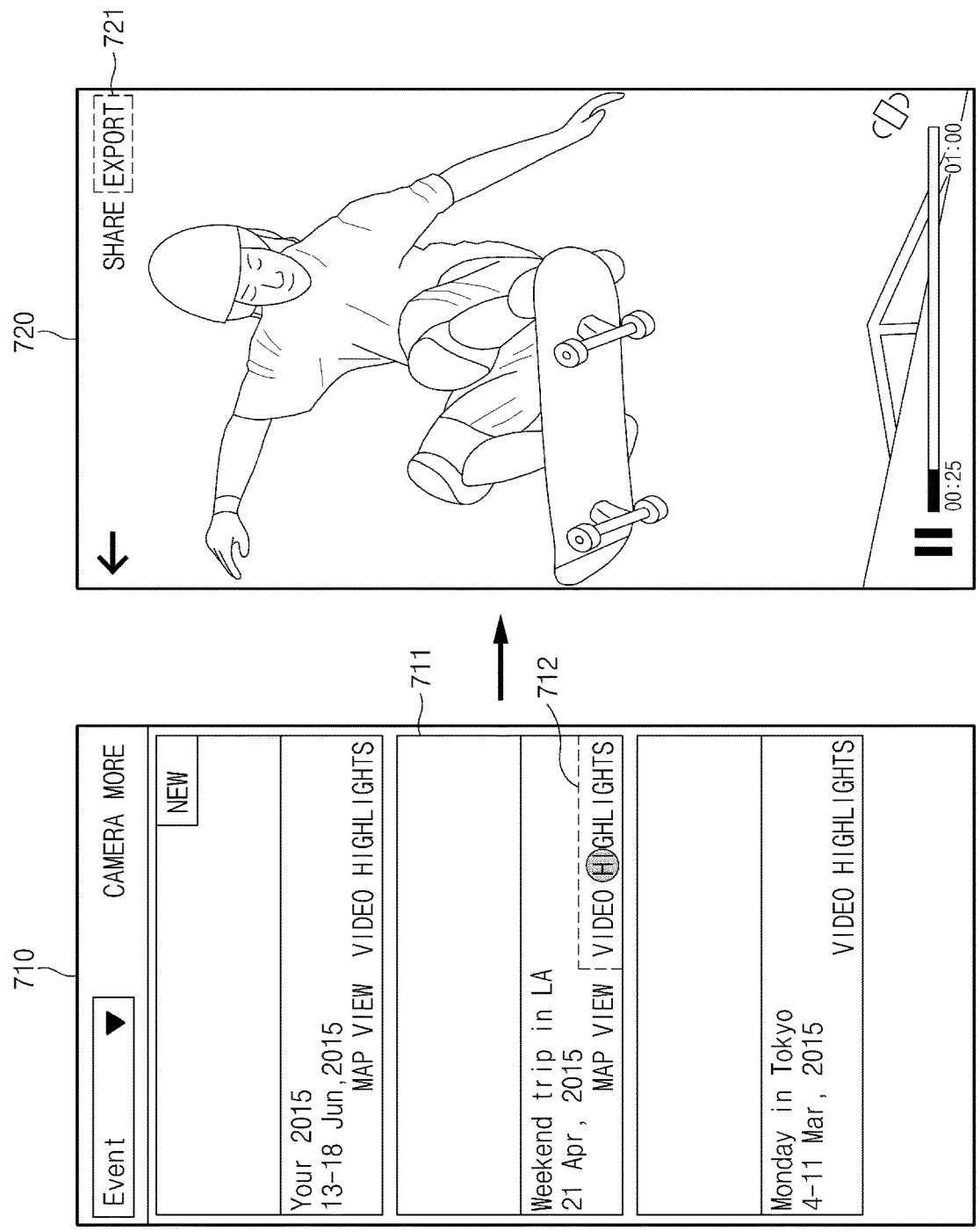
FIG. 7 illustrates example screen images for highlight video playback and storage user interfaces (UIs) according to an embodiment of the present disclosure.

FIG. 7 illustrates example screen images for highlight video playback and storage UIs according to an embodiment of the present disclosure.

Referring to FIG. 7, a media library screen 710 including a plurality of events is displayed. An event for image/video captured during Jun. 13 to 18, 2015 and an event 711 for image/video captured on Apr. 21, 2015 in LA weekend trip may be included in the media library.

When an input (e.g., a touch input, a voice input, or a hovering input) for playing a highlight video occurs with respect to the event 711, the electronic device 100 may perform operations 501 to 509 of FIG. 5, wherein the content selected in operation 501 may be the image/video corresponding to the event 711.

Instead of generating a highlight video in advance and storing it in a memory, the electronic device 100 may perform immediate playback by obtaining data corresponding to a highlight video among image and video data stored in the memory based on metadata determined at a playback time point of the highlight video. Because additional information on a relatively large size of video data is required to be generated in advance at the time of capturing, the electronic device 100 may immediately play a highlight video within a time that does not interfere with user experience, without an analysis time on the video data.

A playback screen 720 of the highlight video played in operation 509 may be output to the display. The playback screen 720 may include control menus for playback screen/highlight video such as a menu for returning to an event list, a sharing menu, and an export menu 721. The selection on the export menu 721 may be understood as the occurrence of a storage event. That is, when the export menu 721 is selected, the electronic device 100 may generate a highlight video in playback as a video file. In this case, the generated video file may also include metadata information used for generating the highlight video as additional information.

Figure 8:
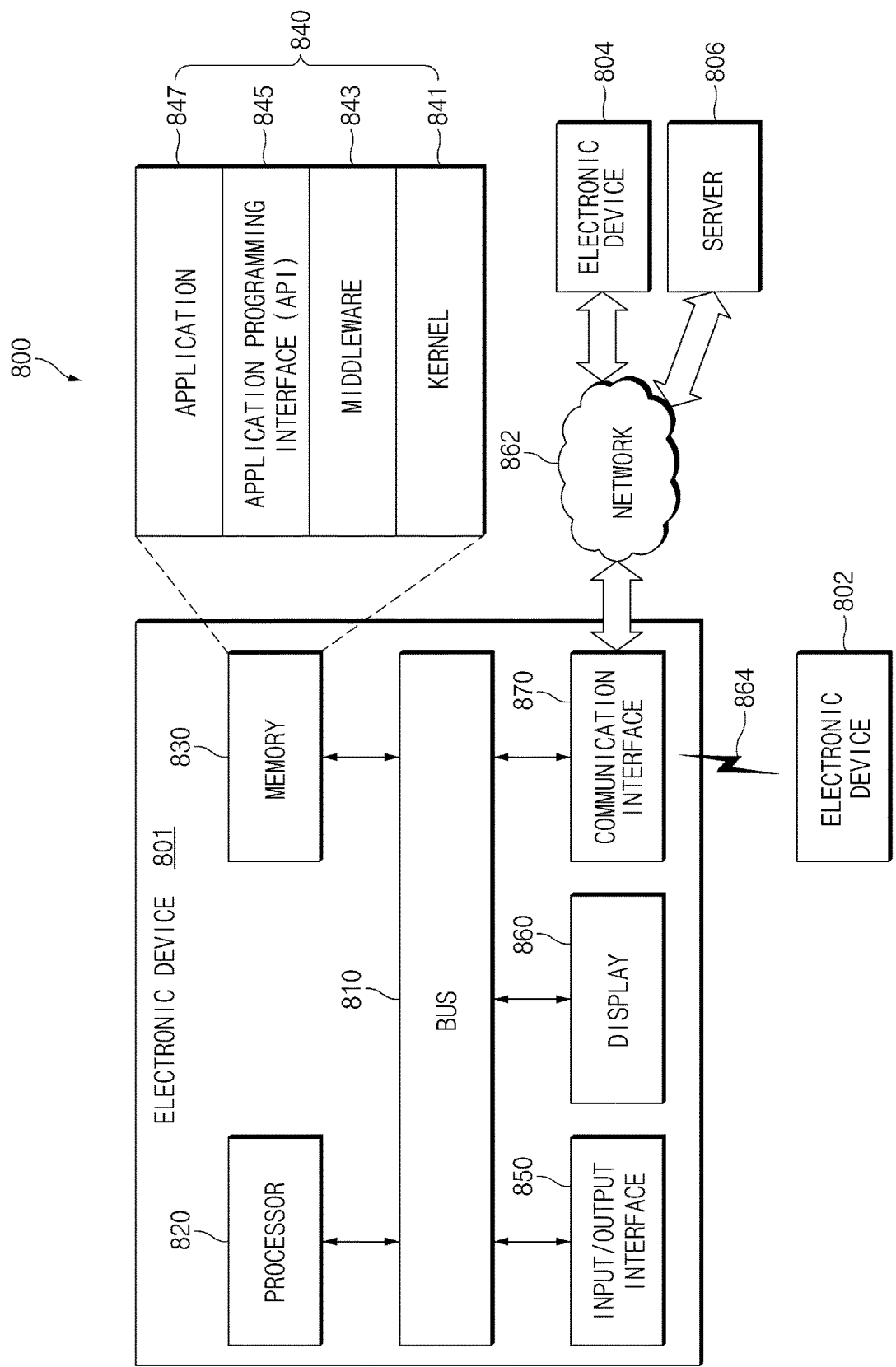
FIG. 8 illustrates an electronic device in a network environment according to an embodiment of the present disclosure.

FIG. 8 illustrates an electronic device in a network environment according to an embodiment of the present disclosure.

Referring to FIG. 8, electronic devices 801, 802, and 804 and a server 806 may be connected to each other through a network 862 or a short-range communication 864. The electronic device 801 includes a bus 810, a processor 820, a memory 830, an input/output interface 850, a display 860, and a communication interface 870. The electronic device 801 may omit at least one of the components or may additionally include a different component.

The bus 810 may include a circuit for connecting the components 810 to 870 to each other and delivering a communication (e.g., control message and/or data) therebetween.

The processor 820 may include at least one of a CPU, an AP, and a communication processor (CP). The processor 820, for example, may execute calculation or data processing for control and/or communication of at least one another component of the electronic device 801.

The memory 830 may include volatile and/or nonvolatile memory. The memory 830 may store instructions or data relating to at least one another component of the electronic device 801. The memory 830 stores software and/or program 840. The program 840 includes a kernel 841, a middleware 843, an application programming interface (API) 845, and/or an application program (or an application) 847. At least part of the kernel 841, the middleware 843, and the API 845 may be referred to as an operating system (OS).

The kernel 841 may control or manage system resources (e.g., the bus 810, the processor 820, the memory 830, etc.) used for performing operations or functions implemented in other programs (e.g., the middleware 843, the API 845, or the application program 847). Additionally, the kernel 841 may provide an interface for controlling or managing system resources by accessing an individual component of the electronic device 801 from the middleware 843, the API 845, or the application program 847.

The middleware 843 may serve as an intermediary role for exchanging data as the API 845 or the application program 847 communicates with the kernel 841.

Additionally, the middleware 843 may process at least one job request received from the application program 847 according to a priority. For example, the middleware 843 may assign to at least one application program 847 a priority for using a system resource (e.g., the bus 810, the processor 820, or the memory 830) of the electronic device 801. For example, the middleware 843 may perform scheduling or load balancing on the at least one job request by processing the at least one job request according to the priority assigned to the at least one job request.

The API 845, as an interface for allowing the application program 847 to control a function provided from the kernel 841 or the middleware 843, may include at least one interface or function (for example, an instruction) for file control, window control, image processing, or character control.

The input/output interface 850 may serve as an interface for delivering instructions or data inputted from a user or another external device to another component(s) of the electronic device 801. Additionally, the input/output interface 850 may output instructions or data received from another component(s) of the electronic device 801 to a user or another external device.

The display 860 may include a liquid crystal display (LCD), a light emitting diode (LED) display, an organic light emitting diode (OLED) display, a microelectromechanical systems (MEMS) display, or an electronic paper display. The display 860 may display various contents (e.g., text, image, video, icon, symbol, etc.) to a user. The display 860 may include a touch screen, and for example, may receive a touch, gesture, proximity, or hovering input by using an electronic pen or a user's body part.

The communication interface 870 may set a communication between the electronic device 801 and the first external electronic device 802, the second external electronic device 804, and/or the server 806. For example, the communication interface 870 may communicate with the second external electronic device 804 or the server 806 in connection to the network 862 through wireless communication or wired communication.

The wireless communication, as a cellular communication protocol, may use at least one of long-term evolution (LTE), LTE Advance (LTE-A), code division multiple access (CDMA), wideband CDMA (WCDMA), universal mobile telecommunications system (UMTS), wireless broadband (WiBro), global system for mobile communications (GSM), etc. Additionally, the wireless communication may include the short-range communication 864. The short range communication 864 may include at least one of wireless fidelity (Wi-Fi), Bluetooth (BT), near field communication (NFC), magnetic stripe transmission (MST), or global navigation satellite system (GNSS).

The MST may generate pulses by using magnetic signals according to transmission data and the pulses may generate magnetic signals. The electronic device 801 may transmit the magnetic signals to a point of sales (POS) device and the POS device may detect the magnetic signals by using an MST reader and restore the data by converting the detected magnetic signals into electrical signals.

The GNSS may include at least one of GPS, Glonass, Beidou navigation satellite system, and Galileo, that is, the European global satellite-based navigation system. Hereinafter, GPS and GNSS may be interchangeably used. The wired communication may include at least one of universal serial bus (USB), high definition multimedia interface (HDMI), recommended standard 932 (RS-232), and plain old telephone service (POTS). The network 862 may include telecommunications network, for example, at least one of computer network (for example, LAN or WAN), internet, and telephone network.

Each of the first and second external electronic devices 802 and 804 may be the same or a different type of device as the electronic device 801.

The server 806 may include a group of one or more servers.

All or part of operations executed on the electronic device 801 may be executed on the electronic device 802, the electronic device 804, and/or the server 806. Accordingly, when the electronic device 801 performs a certain function or service, it may request at least part of a function relating thereto from the electronic device 802, the electronic device 804, and/or the server 806 instead of (or in addition to) executing the function or service by itself. The external electronic device 802, the electronic device 804, and/or the server 806 may execute a requested function or an additional function and may deliver an execution result to the electronic device 801. The electronic device 801 may provide the requested function or service as it is or by processing the received result additionally, e.g., using cloud computing, distributed computing, or client-server computing technology.

Figure 9:
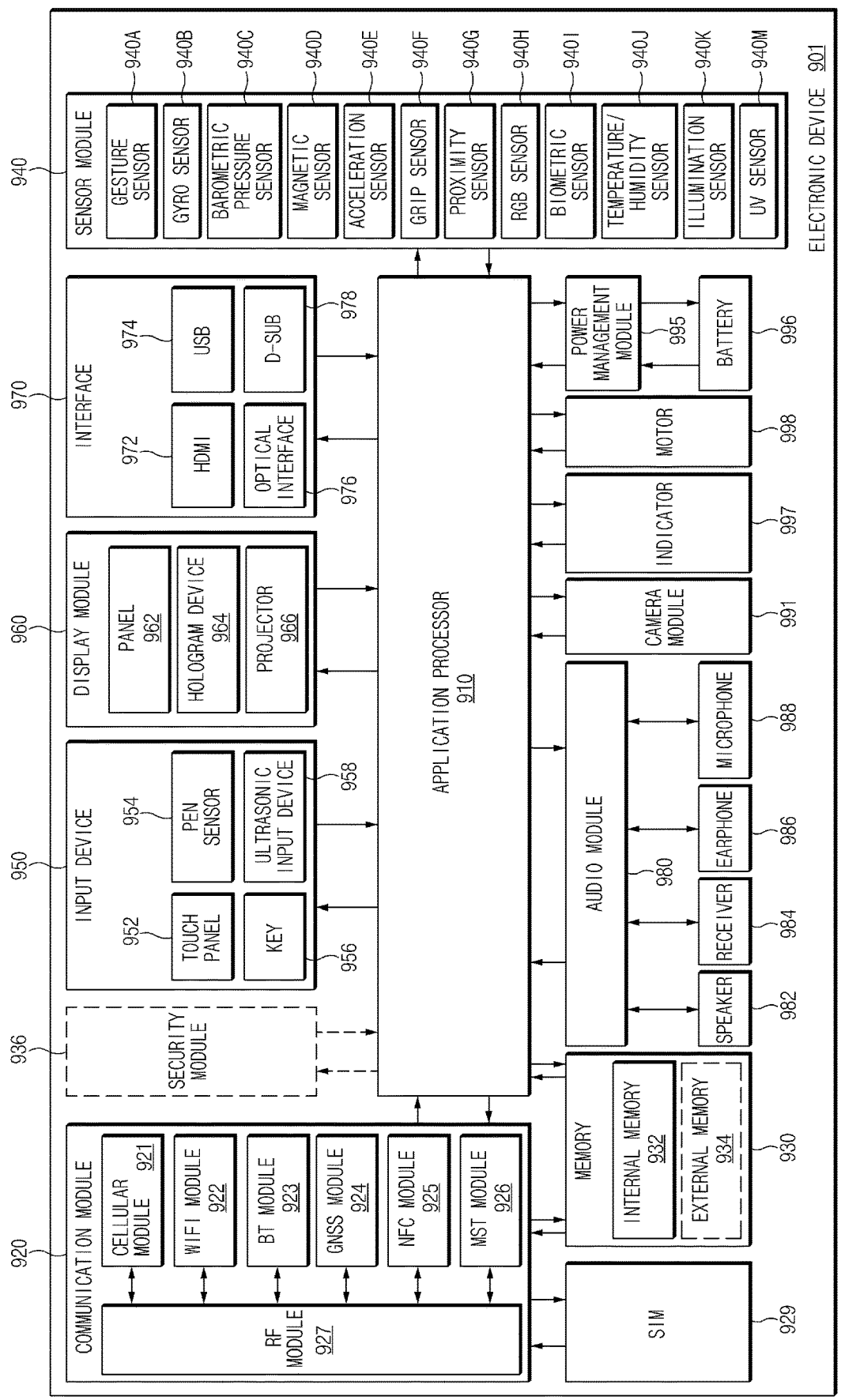
FIG. 9 illustrates an electronic device according to an embodiment of the present disclosure.

An electronic device as illustrated in FIG. 8 or FIG. 9, as will described below, may perform various embodiments disclosed in this specification. For example, the electronic device 801 may include a capturing module (for example, the camera module 991 of FIG. 9) for obtaining at least one image and a processor 820. The processor 820 may obtain additional information relating to the acquisition of the at least one image, and store at least a portion of the additional information in relation to the at least one image. For example, the processor 820 may store at least one of situation information corresponding to a user of the electronic device 801 or another user, analysis information of an obtained image, and user interaction information occurring while an image is obtained, as additional information, in the memory 830.

The processor 820 may receive a request on the at least one image, and provide (or present) the at least one image or the highlight (or video) thereof based on the at least some situation information. Additionally, the processor 820 may determine a theme to be applied to a highlight and provide the highlight based on the theme and the at least one situation information.

The processor 820 may vary a playback condition relating to the at least one image and perform playback.

The processor 820 may obtain, as at least a portion of the situation information, a gesture, a voice, or an expression of the user or the other user for the electronic device or an external electronic device functionally connected to the electronic device in relation to the acquisition of at least one image. For example, the electronic device 801 may include two or more cameras (e.g., a front camera and a rear camera) and the front camera and the rear camera may be activated at the same time. For example, the electronic device 801 may obtain image information on a user of the electronic device 801 or people around a user through a front camera while capturing an object through a rear camera. When generating a video file by using an image captured through a rear camera, the electronic device 801 may generate situation information based on a gesture or expression obtained through a front camera. For example, an expression change, for example, a user, who is captured by a front camera, smiles suddenly, may be used as situation information. The electronic device 801 may obtain information relating to a situation of a user of the electronic device 801 or another user, for example, a gesture, a voice, and an expression, by using an appropriate sensor electrically or functionally connected to the electronic device 801 in addition to an (additional) camera or a microphone for obtaining voice.

The processor 820 may obtain information corresponding to a time point at which the at least one image is obtained, an image property of the at least one image, or a face recognized from the at least one image, as at least a portion of the situation information.

The electronic device 801 may further include a communication module for receiving at least a portion of the situation information from an external electronic device.

The processor 820 may obtain information corresponding to another image relating to the at least one image as at least a portion of the situation information. Additionally, the processor 820 may generate and/or play the at least one image or a highlight thereof by using the other image.

The processor 820 may generate a highlight image for the at least one image in response to the occurrence of a specified event. The specified event may be a highlight image generation request according to a user input, and may be a generation request automatically (internally) occurring according to a condition (e.g., a specific time) set in the electronic device 801.

The electronic device 801 may perform a method including obtaining at least one image through a camera module functionally connected to the electronic device 801, obtaining additional information relating to the acquisition of the at least one image in relation to the acquisition of the at least one image, and storing at least a portion of the additional information in relation to the at least one image.

Additionally, the method may further include receiving a request on the least one image, and presenting the at least one or a highlight thereof based on at least a portion of the situation information.

Additionally, the obtaining of the situation information may include at least one of obtaining, as at least a portion of the situation information, a gesture, a voice, or an expression of the user or the other user for the electronic device or an external electronic device functionally connected to the electronic device in relation to the acquisition of at least one image and obtaining at least a portion of the situation information from the external electronic device.

In addition, various methods disclosed in this specification may be stored as at least one instruction in a storage medium that stores a computer readable instruction. The instruction, when executed by an electronic device, may allow the electronic device to perform at least one operation in the methods.

FIG. 9 illustrates an electronic device according to an embodiment of the present disclosure.

Referring to FIG. 9, the electronic device 901 includes an AP 910, a communication module 920, a subscriber identification module (SIM) 929, a memory 930, a sensor module 940, an input device 950, a display 960, an interface 970, an audio module 980, a camera module 991, a power management module 995, a battery 996, an indicator 997, and a motor 998.

The processor 910 may control a plurality of hardware or software components connected thereto and also may perform various data processing and operations by executing an operating system or an application program. The processor 910 may be implemented with an SoC, for example. The processor 910 may further include a GPU and/or an image signal processor. The processor 910 may include at least part (for example, a cellular module 921) of components illustrated in FIG. 9. The processor 910 may load commands or data received from at least one of other components (e.g., nonvolatile memory) and process them and may store various data in a nonvolatile memory.

The communication module 920 includes a cellular module 921, a Wi-Fi module 922, a BT module 923, a GNSS module 924, an NFC module 925, an MST module 926, and a radio frequency (RF) module 927.

The cellular module 921 may provide a voice call, a video call, a text service, or an internet service through a communication network. The cellular module 921 may perform a distinction and authentication operation on the electronic device 901 in a communication network by using the SIM 929. The cellular module 921 may perform at least part of a function that the processor 910 provides. The cellular module 921 may further include a CP.

Each of the Wi-Fi module 922, the BT module 923, the GNSS module 924, the NFC module 925, and the MST module 926 may include a processor for processing data transmitted/received through a corresponding module. At least part (e.g., two or more) of the cellular module 921, the Wi-Fi module 922, the BT module 923, the GNSS module 924, the NFC module 925, and the MST module 926 may be included in one integrated chip (IC) or IC package.

The RF module 927 may transmit/receive communication signals (e.g., RF signals). The RF module 927 may include a transceiver, a power amp module (PAM), a frequency filter, a low noise amplifier (LNA), and/or an antenna. At least one of the cellular module 921, the Wi-Fi module 922, the Bluetooth module 923, the GNSS module 924, the NFC module 925, and the MST module 926 may transmit/receive RF signals through a separate RF module.

The SIM 929 may include a card including a SIM and/or an embedded SIM and also may include unique identification information (e.g., an integrated circuit card identifier (ICCID)) or subscriber information (e.g., an international mobile subscriber identity (IMSI)).

The memory 930 includes an internal memory 932 and an external memory 934. The internal memory 932 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (e.g., NAND flash memory or NOR flash memory), hard drive, or solid state drive (SSD)).

The external memory 934 may further include flash drive, for example, compact flash (CF), secure digital (SD), micro Micro-SD, Mini-SD, extreme digital (xD), (MultiMediaCard (MMC), and/or a memory stick. The external memory 934 may be functionally and/or physically connected to the electronic device 901 through various interfaces.

The security module 936, a module including a storage space having a relatively higher security level than the memory 930, may be a circuit for securing safe data storage and protected execution environment. The security module 936 may be implemented as a separate circuit and may include an additional processor. The security module 936 may be in a detachable smart chip or a SD card or may include an embedded secure element (eSE) embedded in a fixed chip of the electronic device 901. Additionally, the security module 936 may run on a different OS from the electronic device 901. For example, the security module 936 may run based on java card open platform (JCOP) OS.

The sensor module 940 measures physical quantities or detects an operating state of the electronic device 901, thereby converting the measured or detected information into electrical signals. The sensor module 940 includes a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (for example, a red, green, blue (RGB) sensor), a biometric sensor 940I, a temperature/humidity sensor 940J, an illumination sensor 940K, and an ultra violet (UV) sensor 940M. Additionally or alternatively, the sensor module 940 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 940 may further include a control circuit for controlling at least one sensor therein.

The electronic device 901 may further include a processor configured to control the sensor module 940 as part of or separately from the processor 910 and thus may control the sensor module 940 while the processor 910 is in a sleep state.

The input device 950 includes a touch panel 952, a (digital) pen sensor 954, a key 956, and an ultrasonic input device 958. The touch panel 952 may use at least one of capacitive, resistive, infrared, or ultrasonic methods. Additionally, the touch panel 952 may further include a control circuit. The touch panel 952 may further include a tactile layer to provide tactile response to a user.

The (digital) pen sensor 954 may include a sheet for recognition as part of a touch panel or a separate sheet for recognition.

The key 956 may include a physical button, an optical key, or a keypad, for example.

The ultrasonic input device 958 may detect ultrasonic waves generated from an input tool through a microphone 988 in order to check data corresponding to the detected ultrasonic waves.

The display 960 includes a panel 962, a hologram device 964, and a projector 966.

The panel 962 may be implemented to be flexible, transparent, or wearable, for example. The panel 962 and the touch panel 952 may be configured with one module.

The hologram device 964 may show three-dimensional images in the air by using the interference of light.

The projector 966 may display an image by projecting light on a screen. The screen may be placed inside or outside the electronic device 901.

The display 960 may further include a control circuit for controlling the panel 962, the hologram device 964, or the projector 966.

The interface 970 includes a high-definition multimedia interface (HDMI) 972, a universal serial bus (USB) 974, an optical interface 976, or a D-subminiature (sub) 978, for example.

Additionally or alternatively, the interface 970 may include a mobile high-definition link (MHL) interface, a secure Digital (SD) card/multi-media card (MMC) interface, or an infrared data association (IrDA) standard interface.

The audio module 980 may convert sound into electrical signals and convert electrical signals into sounds. The audio module 980 may process sound information inputted/outputted through a speaker 982, a receiver 984, an earphone 986, and the microphone 988.

The camera module 991, as a device for capturing a still image and a video, may include at least one image sensor (e.g., a front sensor or a rear sensor), a lens, an image signal processor (ISP), and/or a flash (for example, an LED or a xenon lamp).

The power management module 995 may manage the power of the electronic device 901. The power management module 995 may include a power management IC (PMIC), a charger IC, or a battery gauge. The PMIC may have a wired and/or wireless charging method. For example, the wireless charging method may be a magnetic resonance method, a magnetic induction method, or an electromagnetic method. An additional circuit for wireless charging, a circuit such as a coil loop, a resonant circuit, or a rectifier circuit, may be added.

The battery gauge may measure the remaining amount of the battery 996, or a voltage, current, or temperature thereof during charging. The battery 996 may include a rechargeable battery and/or a solar battery.

The indicator 997 may display a specific state of the electronic device 901 or part thereof (e.g., the processor 910), for example, a booting state, a message state, or a charging state.

The motor 998 may convert electrical signals into mechanical vibration and may generate vibration or haptic effect.

The electronic device 901 may also include a processing device (e.g., a GPU) for mobile TV support. A processing device for mobile TV support may process media data according to the standards such as digital multimedia broadcasting (DMB), digital video broadcasting (DVB), or mediaFLO™.

Each of the above-mentioned components of an electronic device according to the various embodiments of the present disclosure may be configured with at least one component and the name of a corresponding component may vary according to the kind of an electronic device. An electronic device according to various embodiments of the present disclosure may include at least one of the above-mentioned components, may not include some of the above-mentioned components, or may further include another component.

Additionally, some of components in an electronic device according to various embodiments of the present disclosure are configured as one entity, so that functions of previous corresponding components are performed identically.

Figure 10:
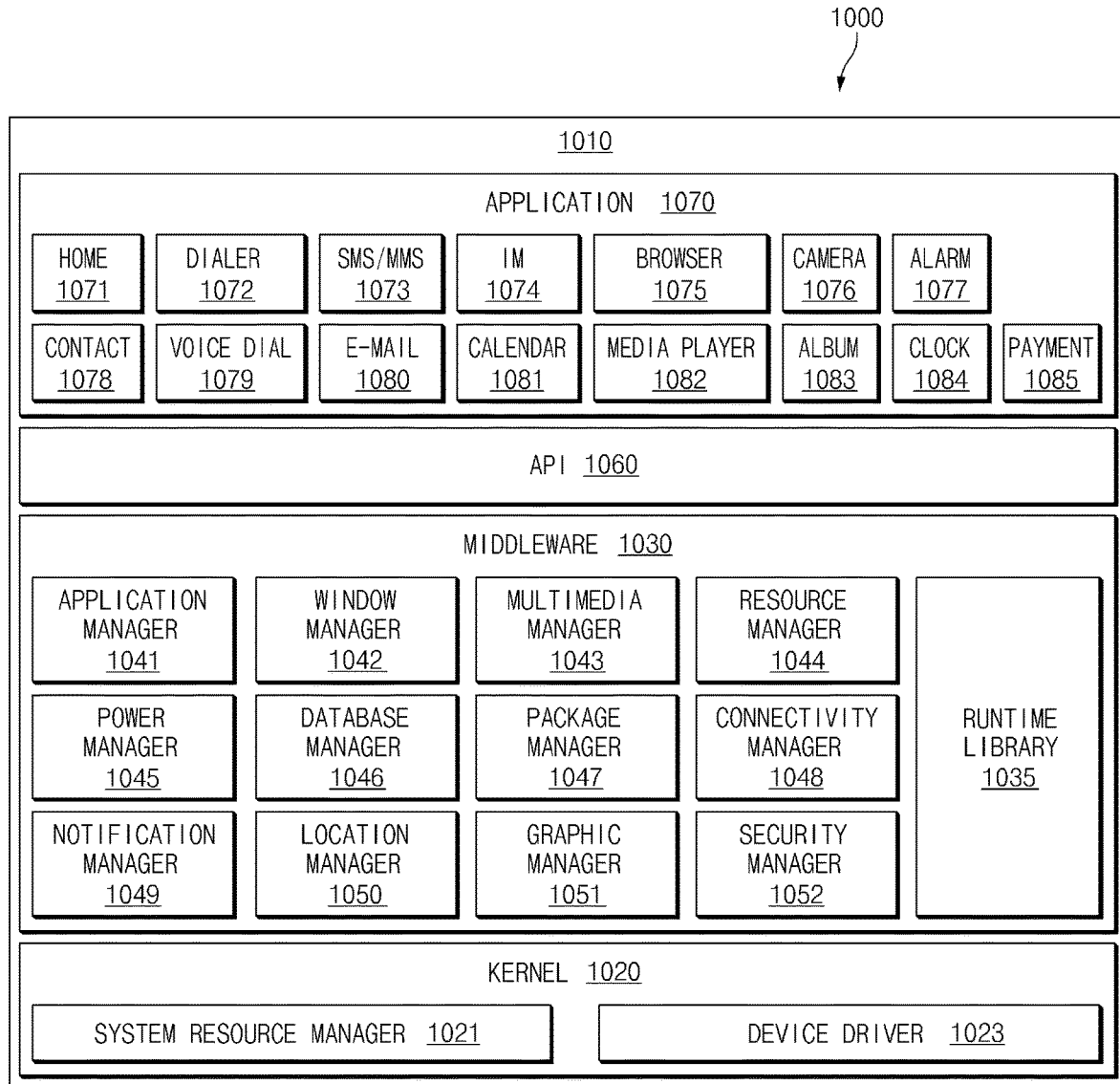
FIG. 10 illustrates a program module according to an embodiment of the present disclosure.

FIG. 10 illustrates a program module according to an embodiment of the present disclosure.

Referring to FIG. 10, the program module 1010 includes an OS for controlling a resource relating to an electronic device and/or various applications running on the OS.

The program module 1010 includes a kernel 1020, a middleware 1030, an API 1060, and applications 1070. At least part of the program module 1010 may be preloaded on an electronic device or may be downloaded from an external electronic device.

The kernel 1020 includes a system resource manager 1021 and a device driver 1023.

The system resource manager 1021 may perform the control, allocation, or retrieval of a system resource. The system resource manager 1021 may include a process management unit, a memory management unit, or a file system management unit.

The device driver 1023 may include a display driver, a camera driver, a Bluetooth driver, a sharing memory driver, a USB driver, a keypad driver, a Wi-Fi driver, an audio driver, or an inter-process communication (IPC) driver.

The middleware 1030 may provide a function that the applications 1070 require commonly, or may provide various functions to the applications 1070 through the API 1060 in order to allow the applications 1070 to efficiently use a limited system resource inside the electronic device.

The middleware 1030 includes at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, a security manager 1052, and a payment manager 1054.

The runtime library 1035 may include a library module that a complier uses to add a new function through a programming language while the application 1070 is running. The runtime library 1035 may perform a function on input/output management, memory management, or an arithmetic function.

The application manager 1041 may mange the life cycle of at least one application among the applications 1070.

The window manager 1042 may manage a GUI resource used in a screen.

The multimedia manager 1043 may recognize a format for playing various media files and may encode or decode a media file by using the codec corresponding to a corresponding format.

The resource manager 1044 may manage a resource such as a source code, a memory, or a storage space of at least any one of the applications 1070.

The power manager 1045 may operate together with a basic input/output system (BIOS) to manage the battery or power and may provide power information necessary for an operation of the electronic device.

The database manager 1046 may create, search, or modify a database used in at least one application among the applications 1070.

The package manager 1047 may manage the installation or update of an application distributed in a package file format.

The connectivity manger 1048 may manage a wireless connection such as WiFi or Bluetooth.

The notification manager 1049 may display or notify an event such as arrival messages, appointments, and proximity alerts to a user in a manner of not interrupting the user.

The location manager 1050 may manage location information on an electronic device.

The graphic manager 1051 may manage a graphic effect to be provided to a user or a UI relating thereto.

The security manager 1052 may provide various security functions for system security or user authentication.

When an electronic device (includes a phone function, the middleware 1030 may further include a telephony manager for managing a voice or video call function of the electronic device.

The middleware 1030 may include a middleware module for forming a combination of various functions of the above-mentioned components. The middleware 1030 may provide a module specialized for each type of OS to provide differentiated functions. Additionally, the middleware 1030 may delete part of existing components or add new components dynamically.

The API 1060, as a set of API programming functions, may be provided as another configuration according to OS. For example, one API set may be provided for a particular OS and at least two API sets may be provided for a different OS.

The applications 1070 include a home application 1071, a dialer application 1072, an short messaging service/multimedia messaging service (SMS/MMS) application 1073, an instant message application 1074, a browser application 1075, a camera application 1076, an alarm application 1077, a contact application 1078, a voice dial application 1079, an e-mail application 1080, a calendar application 1081, a media player application 1082, an album application 1083, a clock application 1084. Additionally, the applications 1070 may include a health care application (e.g., an application that measures an exercise amount or blood sugar level), or an environmental information provision application (e.g., an application that provides air pressure, humidity, or temperature information).

The applications 1070 may include an information exchange application for supporting information exchange between electronic devices. The information exchange application may include a notification relay application for relaying specific information to the external device or a device management application for managing the external electronic device.

For example, the notification relay application may have a function for relaying to an external electronic device notification information occurring from another application (e.g., an SMS/MMS application, an e-mail application, a health care application, and/or an environmental information application) of the electronic device.

Additionally, the notification relay application may receive notification information from an external electronic device and may then provide the received notification information to a user.

The device management application may manage (e.g., install, delete, and/or update) at least one function (turn-on/turn off of the external electronic device itself (or some components) or the brightness (or resolution) adjustment of a display) of an external electronic device communicating with the electronic device, an application operating in the external electronic device, or a service (e.g., call service or message service) provided from the external device.

The applications 1070 may include a specified application (e.g., a health care application of a mobile medical device) according to the property of an external electronic device. The applications 1070 may include an application received from an external electronic device.

The applications 1070 may include a preloaded application or a third party application downloadable from a server. The names of components in the program module 1010 according to the shown embodiment may vary depending on the type of OS.

At least part of the program module 1010 may be implemented with software, firmware, hardware, or a combination thereof.

At least part of the programming module 1010 may be implemented (e.g., executed) by a processor (e.g., the processor 910). At least part of the program module 1010 may include a module, a program, a routine, sets of instructions, or a process to perform at least one function, for example.

A time consumed for analyzing an original video file is reduced when a highlight video is generated, and as a result, a highlight video generation time may be reduced.

Additionally, by storing a highlight video in a storage space only when a storage event for the highlight video occurs, a system resource may be used efficiently. Further, various effects identified directly or indirectly through this specification may be provided.

Herein, the term "module" may mean a unit including a combination of at least one of hardware, software, and firmware. The term "module" and the term "unit", "logic", "logical block", "component", or "circuit" may be interchangeably used.

A module may be a minimum unit or part of an integrally configured component. A module may be a minimum unit performing at least one function or part thereof. A module may be implemented mechanically or electronically. For example, a module may include at least one of an application-specific integrated circuit (ASIC) chip performing certain operations, field-programmable gate arrays (FPGAs), or a programmable-logic device, all of which are known or to be developed in the future.

At least part of a device (e.g., modules or functions thereof) or a method (e.g., operations) according to this disclosure, for example, as in a form of a programming module, may be implemented using an instruction stored in computer-readable storage media. When at least one processor executes an instruction, the at least one processor may perform a function corresponding to the instruction. For example, the non-transitory computer-readable storage media may include the memory 830.

The non-transitory computer-readable storage media may include hard disks, floppy disks, magnetic media (for example, magnetic tape), optical media (for example, CD-ROM, and Digital Versatile Disc (DVD)), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:
1. An electronic device, comprising:
   a memory;
   a camera; and
   a processor configured to:
      control the camera to obtain images,
      generate additional information based at least on image analysis on the images while the images are obtained through the camera,
      encode the images as video data, and
      store a video file including the video data and the additional information in the memory,
   wherein the processor is further configured to generate the additional information to include, when a change of a specific parameter value obtainable by the image analysis on the images is greater than a specified threshold, an occurrence time of the change and information on the change, the specific parameter value being obtained based on at least one of a histogram analysis or a sum-of-absolute difference (SAD) analysis on at least one of the images.

2. The electronic device of claim 1, wherein the processor is further configured to generate the additional information to include an acquisition time of the images and at least one parameter value obtainable from image data of the images, based on the image analysis on the images.

3. The electronic device of claim 2, wherein when the processor is further configured to:
   detect a face in the image, and
   generate the additional information to include the acquisition time of the image and information on the detected face.

4. The electronic device of claim 1, wherein the processor is further configured to generate the additional information to include a time at which the user input occurs and information on the user input.

5. The electronic device of claim 4, wherein the processor is further configured to generate the additional information to include, when a touch input or a hovering input occurs, an occurrence time of the touch input or the hovering input and information on the touch input or the hovering input.

6. The electronic device of claim 4, wherein the processor is further configured to generate the additional information to include, when a zoom-in or zoom-out input occurs, an occurrence time of the zoom-in or zoom-out input and information on the zoom-in or zoom-out input.

7. The electronic device of claim 1, further comprising a sensor,
   wherein the processor is further configured to generate the additional information to include, when data satisfying a specified condition or a change in the data is detected in the sensor, a time of the change detection and information relating to the sensor.

8. The electronic device of claim 1, further comprising a communication module,
   wherein the processor is further configured to generate the additional information to include, when information satisfying a specified condition is received through the communication module, an acquisition time of an image obtained at the reception time and information on the received information.

9. The electronic device of claim 8, wherein the electronic device is connected to an external electronic device through the communication module, and
   wherein the information satisfying the specified condition includes information on data detected in a sensor equipped in the external electronic device.

10. The electronic device of claim 1, wherein the memory stores content files including the video file, and
    wherein the processor is further configured to generate a highlight video based on the content files and the additional information of the video file.

11. The electronic device of claim 10, wherein the content files further includes an image file, and
    wherein the processor is further configured to obtain metadata of the image file through post processing the image file and generate the highlight video further based on the obtained metadata.

12. The electronic device of claim 10, wherein the processor is further configured to:
    determine a theme to be applied to the highlight video, and
    generate the highlight video based on the theme and the additional information.

13. The electronic device of claim 10, wherein the processor is further configured to obtain data corresponding to the highlight video among the content files, from the memory, when playing the highlight video.

14. The electronic device of claim 10, wherein the processor is further configured to, when a storage event for the highlight video occurs, store the highlight video in the memory.

15. A method of generating video content in an electronic device, the method comprising:
- obtaining images through a camera of the electronic device;
- generating additional information based at least on image analysis on the images while the images are obtained;
- encoding the images as video data; and
- storing a video file including the video data and the additional information,
- wherein the additional information is generated to include, when a change of a specific parameter value obtainable by the image analysis on the images is greater than a specified threshold, an occurrence time of a change and information on the change, the specific parameter value being obtained based on at least one of a histogram analysis or a sum-of-absolute difference (SAD) analysis on at least one of the images.

16. The method of claim 15, further comprising generating a highlight video for content files including the video file, based on at least the additional information.

17. The method of claim 16, wherein generating the highlight video comprises determining a theme or an effect to be applied to the highlight video.

18. The method of claim 17, further comprising storing the highlight video.

19. A non-transitory storage medium for storing a computer readable instruction, wherein the instruction, when executed by an electronic device, controls the electronic device to:
- obtain images through a camera of the electronic device;
- generate additional information based at least on image analysis on the images while the images are obtained;
- encode the images as video data; and
- store a video file including the video data and the additional information,
- wherein the additional information is generated to include, when a change of a specific parameter value obtainable by the image analysis on the images is greater than a specified threshold, an occurrence time of a change and information on the change, the specific parameter value being obtained based on at least one of a histogram analysis or a sum-of-absolute difference (SAD) analysis on at least one of the images.

* * * * *